US008434023B2

(12) United States Patent
Ge

(10) Patent No.: US 8,434,023 B2
(45) Date of Patent: Apr. 30, 2013

(54) ARRANGING ICONS ACCORDING TO A WEIGHTED VALUE CALCULATED IN PART USING CLICK FREQUENCY

(75) Inventor: Chi-Sheng Ge, Taipei Hsien (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 404 days.

(21) Appl. No.: 12/848,192

(22) Filed: Aug. 1, 2010

(65) Prior Publication Data

US 2011/0138328 A1 Jun. 9, 2011

(30) Foreign Application Priority Data

Dec. 3, 2009 (CN) .......................... 2009 1 0310781

(51) Int. Cl.
*G06F 3/048* (2006.01)
(52) U.S. Cl.
USPC ............................ 715/811; 715/745; 715/810
(58) Field of Classification Search .................. None
See application file for complete search history.

(56) References Cited

U.S. PATENT DOCUMENTS

| 5,396,264 | A  | * | 3/1995 | Falcone et al. ................ 715/811 |
| 5,673,405 | A  | * | 9/1997 | Tange ........................... 715/745 |
| 2003/0080993 | A1 | * | 5/2003 | Baker ............................ 345/738 |
| 2007/0083827 | A1 | * | 4/2007 | Scott et al. .................... 715/811 |
| 2008/0126971 | A1 | * | 5/2008 | Kojima ......................... 715/771 |
| 2011/0028138 | A1 | * | 2/2011 | Davies-Moore et al. ...... 455/418 |

* cited by examiner

*Primary Examiner* — Stephen Hong
*Assistant Examiner* — Asher Kells
(74) *Attorney, Agent, or Firm* — Altis Law Group, Inc.

(57) ABSTRACT

A method for arranging icons in an electronic device is provided. The electronic device includes a storage unit storing a table recording icons provided by the electronic device and the number of click frequency of each of the icons. The method includes recording which of the icons is clicked and updating the number of click frequency of the clicked icon in the table, further causing the number of click frequency of the clicked icon to increase one if the icon is clicked. Then, arranging some of the icons according to the number of click frequency recorded in the table if a currently run application is closed.

8 Claims, 3 Drawing Sheets

ARRANGING ICONS ACCORDING TO A WEIGHTED VALUE CALCULATED IN PART USING CLICK FREQUENCY

BACKGROUND

1. Technical Field

The present disclosure relates to electronic devices and, particularly, to an electronic device capable of automatically arranging displayed icons and a method thereof.

2. Description of Related Art

With the development of portable electronic devices, for example, mobile phones, the portable electronic devices have more and more functions, and consequently have more and more function icons. As the size of a display of a portable electronic device is relatively smaller, a user usually has to page up or page down the icons to find the desired icons, which is inconvenient.

BRIEF DESCRIPTION OF THE DRAWINGS

The components of the drawings are not necessarily drawn to scale, the emphasis instead being placed upon clearly illustrating the principles of an electronic devices capable of arranging icons and a method thereof. Moreover, in the drawings, like reference numerals designate corresponding parts throughout several views.

DETAILED DESCRIPTION

Figure 1:
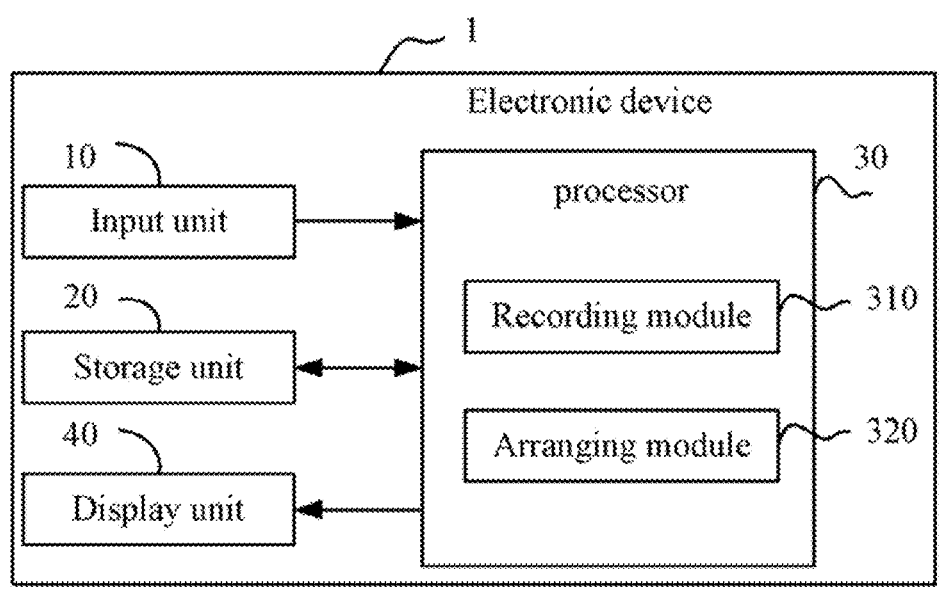
FIG. 1 is a block diagram of an electronic device in accordance with an exemplary embodiment.

Referring to FIG. 1, an electronic device 1 in accordance with an exemplary embodiment is shown. The electronic device 1 may be a mobile phone, a PDA, or a computer. The electronic device 1 includes an input unit 10, a storage unit 20, a processor 30, and a display unit 40.

In this embodiment, the storage unit 20 stores a first table (shown below). The first table records icons provided by the electronic device 1 and click frequencies of each icon. The first table includes rows recording a plurality of click frequencies for the icons and columns corresponding to the same icons clicked. Each number in the intersection of one icon in the column and one icon in the row represents the click frequencies of the icon in the row after the icon in the column is clicked. For example, the number "6" in the intersection of icon E in the column and icon C in the row represents the click frequencies of the icon C in the row after the icon E in the column is clicked is "6". Initially, each number in the first table is zero.

FIRST TABLE

|        | Icon A | Icon B | Icon C | Icon D | Icon E | ... |
|--------|--------|--------|--------|--------|--------|-----|
| Icon A | 0      | 3      | 1      | 5      | 0      | ... |
| Icon B | 1      | 0      | 0      | 5      | 0      | ... |
| Icon C | 4      | 3      | 0      | 1      | 6      | ... |
| Icon D | 0      | 0      | 3      | 0      | 0      | ... |
| Icon E | 1      | 2      | 3      | 2      | 0      | ... |
| ...    | ...    | ...    | ...    | ...    | ...    | ... |

In an alternative embodiment, the storage unit 20 stores a second table (as shown below). The second table includes a first column recording two icons clicked in sequence. The later icon in each row is clicked after the former icon has been clicked. The second table also includes a second column recording the click frequency "n" of each later icon in the first column, and a third column recording run time "t" of the application associated with each later icon. The second table further includes a fourth column recording weighted values "r". Each weighted value "r" is obtained according to the formula:

$$\gamma = n \times \alpha + t \times \beta.$$

$\alpha$ and $\beta$ are percentages. $\alpha$ and $\beta$ can be preset by users through the input unit 10. In the embodiment, $\alpha$ is 40% and $\beta$ is 60%. For example, the weighted value "6.8" in the second row represents the click frequencies, the run time and the weighted value of the icon C after the icon A is clicked is "5", "8", and "6.8", respectively. Initially, each number in the second table is zero.

SECOND TABLE

| Icon | Click frequency | Run time | Weighted value |
|------|-----------------|----------|----------------|
| Icon A → Icon B | 0 | 0  | 0   |
| Icon A → Icon C | 5 | 8  | 6.8 |
| Icon A → Icon D | 0 | 0  | 0   |
| Icon A → Icon E | 2 | 6  | 4.4 |
| Icon B → Icon A | 0 | 0  | 0   |
| Icon B → Icon C | 6 | 10 | 8.4 |
| ...  | ...             | ...      | ...            |
| ...  | ...             | ...      | ...            |

The processor 30 includes a recording module 310 and an arranging module 320.

In this embodiment, the recording module 310 is configured to record which icon is clicked and update the corresponding click frequencies of the clicked icon in the first table. When one icon is clicked, the recording module 310 causes the corresponding clicked frequencies in the intersection of the currently clicked icon and the formerly clicked icon to increase one. In the alternative embodiment, the recording module 310 further records the run time of each run application, and updates the run time corresponding to each later icon in the second table. The recording module 310 further updates each weighted value "r" corresponding to the icons according to the above described formula: $\gamma = n \times \alpha + t \times \beta$.

Figure 2:
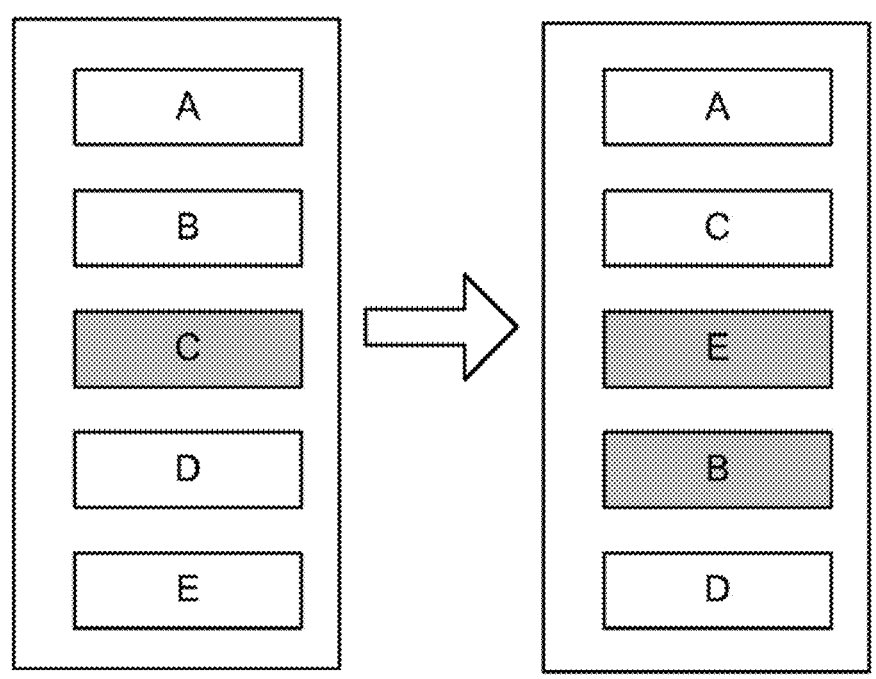
FIG. 2 is a schematic view showing the change of the arrangement of displayed icons.

In this embodiment, when a current application of one icon is closed, the arranging module 320 obtains the click frequencies recorded in a row associated with the icon from the first table. The arranging module 320 further arranges the icons in a descending order according to the obtained the click frequencies, and causes a predetermined number of the icons whose click frequencies are higher than those of the rest of the icons to be displayed directly after the icon. The predetermined number can be default or preset by users through the input unit 10. As shown in FIG. 2, the icon A, the icon B, the icon C, the icon D, and the icon E are displayed. The predetermined number is two. An application of the icon C is currently run. When the application is closed, the arranging module 320 obtains the click frequencies of the icon A, the icon B, the icon D, and the icon E in a row associated with the icon C from the first table. The click frequencies of the icon E and the icon B is greater than that of the icon A and the icon D, and the click frequencies of the icon E is greater than that of the icon B. The arranging module 320 then causes the icon E and the icon B to be displayed in the display unit 40 directly after the icon C.

In the alternative embodiment, when the current application of one icon is closed, the arranging module 320 obtains the weighted values recorded in a column associated with the icon from the second table. The arranging module 320 further arranges the icons in a descending order according to the obtained weighted value, and causes a predetermined number of the icons whose weighted values are before the rest of the icons to be displayed directly in the display unit 40 after the icon.

The recording module 310 is further configured to set the numbers in the first table or in the second table to zero after the arranging module 320 has arranged the icons.

With such configuration, the electronic device 1 can automatically arrange the icons at least according to the click frequencies of the icons, thus user can quickly find desired function icons.

Figure 3:
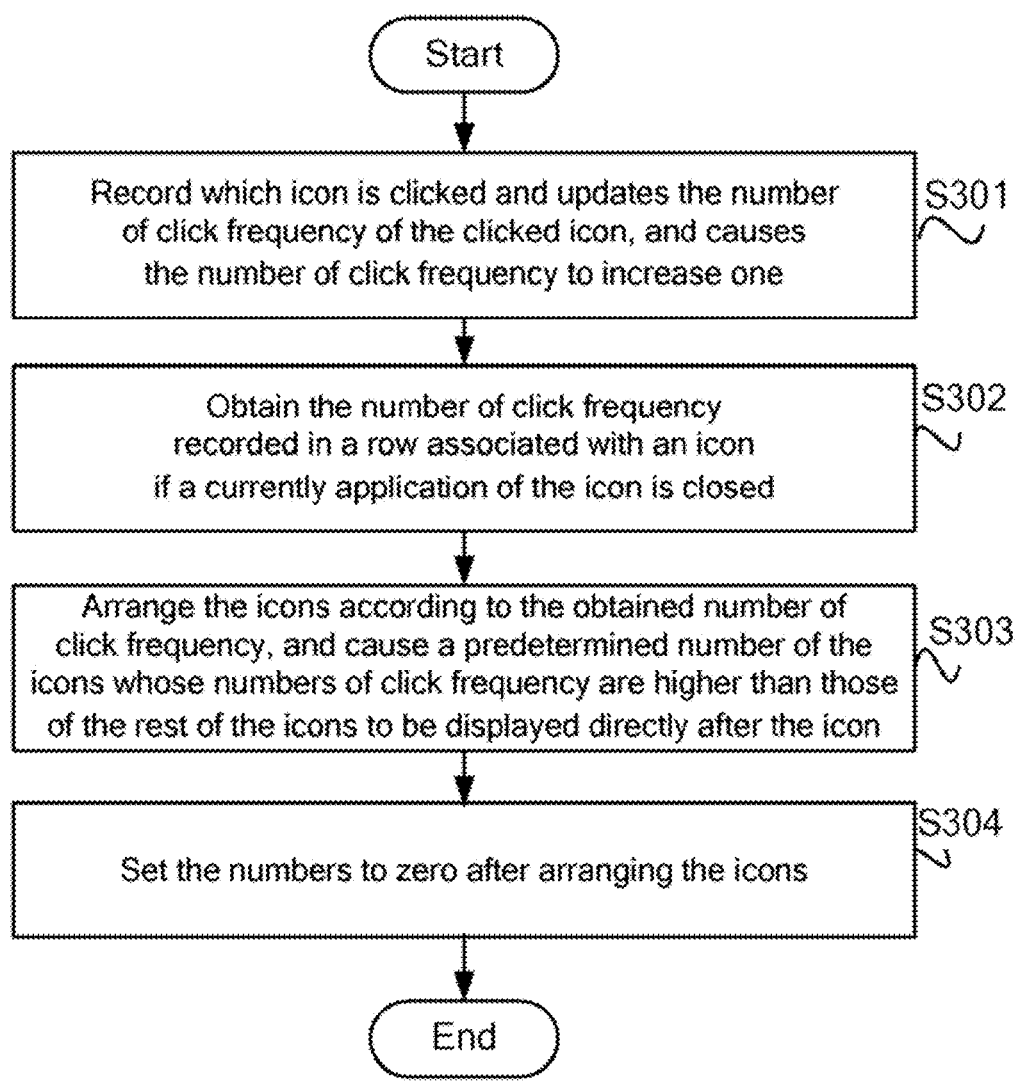
FIG. 3 is a flowchart of a method for arranging icons in accordance with an exemplary embodiment.

FIG. 3 is a flowchart of a method for arranging icons in accordance with an exemplary embodiment.

In step S301, the recording module 310 records which icon is clicked and updates the click frequencies of the clicked icon in the first table, and causes the number of click frequency in the intersection of one currently clicked icon and the formerly clicked icon to increase one. In an alternative embodiment, the recording module 310 further records the run time of each run application, and updates the run time corresponding to each later function icon in the second table. The recording module 310 further updates each weighted value "r".

In step S302, the arranging module 320 obtains the click frequencies recorded in a row associated with an icon from the first table if a current application of the icon is closed. In the alternative embodiment, the arranging module 320 obtains the weighted values in a column associated with the icon from the second table.

In step S303, the arranging module 320 arranges the icons in a descending order according to the obtained click frequencies, and causes a predetermined number of the icons whose click frequencies are higher than those of the rest of the icons to be displayed in the display unit 40 directly after the icon. In the alternative embodiment, the arranging module 320 arranges the icons in a descending order according to the obtained weighted value, and causes a predetermined number of the icons whose weighted values are before the rest of the icons to be displayed in the display unit 40 directly after the icon.

In step S304, the recording module 310 sets the numbers in the first table or in the second table to zero after the arranging module 320 has arranged the function icons.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electronic device, comprising:
a storage unit storing a table recording a plurality of click frequencies respectively for a plurality of icons provided by the electronic device; and
a processor, comprising
a recording module configured to record which of the icons is clicked and at least update one of the click frequencies corresponding to the clicked icon in the table, wherein when the one of the icons is clicked, the recording module causes the corresponding click frequency of the clicked icon to increase by one;
wherein the table comprises a first column, a second column, a third column, and a fourth column; the first column of each storage unit records two icons, a former icon and a later icon, the later icon in each storage unit is clicked after the former icon is clicked; the second column records the click frequency of each later icon in the first column; the third column records run time of the application associated with each later icon; the fourth column records weighted values through a formula; the formula is $\gamma = n \times \alpha + t \times \beta$, where "$\gamma$" is the weighted value, "n" is the use frequency, "t" is the use time, and "$\alpha$" and "$\beta$" are default;
wherein the processor further comprises an arranging module configured to arrange some of the icons at least according to the weighted values recorded in the table.

2. The electronic device as described in claim 1, wherein the recording module further records the run time of each run application, updates the run time corresponding to each later icon, and updates each weighted value corresponding to the icon.

3. The electronic device as described in claim 2, wherein the arranging module obtains the weighted values recorded in a column associated with the icon, arranges the icons in a descending order according to the obtained weighted value, and causes a predetermined number of the icons whose weighted values are before the rest of the icons to be displayed directly.

4. The electronic device as described in claim 3, wherein the recording module further sets the numbers in the table to zero after the arranging module arranges the icons.

5. A method for arranging icons in an electronic device, the electronic device comprising a storage unit storing a table recording a plurality of click frequencies respectively for a plurality of icons provided by the electronic device, comprising:
recording which of the icons is clicked and at least updating one of the click frequencies corresponding to the clicked icon in the table, further causing the corresponding click frequency of the clicked icon to increase one when the one of the icons is clicked,
wherein the table comprises a first column, a second column, a third column, and a fourth column; the first column of each storage unit records two icons, a former icon and a later icon, the later icon in each storage unit is clicked after the former icon is clicked; the second column records the click frequency of each later icon in the first column; the third column records run time of the application associated with each later icon; the fourth column records weighted values through a formula; the formula is $\gamma = n \times \alpha + t \times \beta$, where "$\gamma$" is the weighted value, "n" is the use frequency, "t" is the use time, and "$\alpha$" and "$\beta$" are default; and
arranging some of the icons at least according to the weighted values recorded in the table.

6. The method for arranging icons as described in claim 5 further comprising recording the run time of each run application, updating the run time corresponding to each later icon, and updating each weighted value corresponding to the icon.

7. The method for arranging icons as described in claim 6 further comprising obtaining the weighted values recorded in a column associated with the icon, arranging the icons in a descending order according to the obtained weighted value, and causing a predetermined number of the icons whose weighted values are before the rest of the icons to be displayed directly.

8. The method for arranging icons as described in claim 7 further comprising setting the numbers in the table to zero after arranging the icons.

* * * * *